US011989330B2

(12) United States Patent
Li

(10) Patent No.: US 11,989,330 B2
(45) Date of Patent: May 21, 2024

(54) PERMISSION MANAGEMENT METHOD AND TERMINAL DEVICE

(71) Applicant: VIVO MOBILE COMMUNICATION CO., LTD., Chang'an Dongguan (CN)

(72) Inventor: Gen Li, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 382 days.

(21) Appl. No.: 17/360,010

(22) Filed: Jun. 28, 2021

(65) Prior Publication Data

US 2021/0326479 A1    Oct. 21, 2021

Related U.S. Application Data

(63) Continuation of application No. PCT/CN2019/125027, filed on Dec. 13, 2019.

(30) Foreign Application Priority Data

Dec. 28, 2018    (CN) .......................... 201811626750.4

(51) Int. Cl.
*G06F 21/00*    (2013.01)
*G06F 21/10*    (2013.01)
(Continued)

(52) U.S. Cl.
CPC .......... *G06F 21/6281* (2013.01); *G06F 21/10* (2013.01); *G06F 21/31* (2013.01); *G06F 21/577* (2013.01); *G06F 2221/032* (2013.01)

(58) Field of Classification Search
CPC ........ G06F 21/10; G06F 21/31; G06F 21/577; G06F 21/6281
See application file for complete search history.

(56) References Cited

U.S. PATENT DOCUMENTS

2015/0052582 A1* 2/2015 Chow .................. H04L 51/046
    726/3
2015/0222641 A1* 8/2015 Lu .......................... G06F 21/57
    726/1

FOREIGN PATENT DOCUMENTS

CN    108427530 A      8/2018
CN    108875394 A  * 11/2018 ........... G06F 21/604
(Continued)

OTHER PUBLICATIONS

Extended European Search Report related to Application No. 19903245.9; dated Jan. 14, 2022.

(Continued)

*Primary Examiner* — Rodman Alexander Mahmoudi
(74) *Attorney, Agent, or Firm* — von Briesen & Roper, s.c.

(57) ABSTRACT

A permission management method and a terminal device are provided, where the permission management method is applied to the terminal device including a first display area and a second display area. The permission management method includes: determining a target permission management policy corresponding to a first application based on a display area in which the first application is located (101); and controlling permission management for the first application according to the target permission management policy (102); where the target permission management policy includes a first permission management policy corresponding to the first display area and/or a second permission management policy corresponding to the second display area.

15 Claims, 2 Drawing Sheets

(51) Int. Cl.
  *G06F 21/31* (2013.01)
  *G06F 21/57* (2013.01)
  *G06F 21/62* (2013.01)

(56) References Cited

FOREIGN PATENT DOCUMENTS

CN   108875394 A   11/2018
CN   109684825 A   4/2019

OTHER PUBLICATIONS

International Search Report & Written Opinion related to Application No. PCT/CN2019/125027; dated Mar. 13, 2020.

\* cited by examiner

PERMISSION MANAGEMENT METHOD AND TERMINAL DEVICE

CROSS-REFERENCE TO RELATED APPLICATIONS

This application is continuation application of PCT International Application No. PCT/CN2019/125027 filed on Dec. 13, 2019, which claims priority to Chinese Patent Application No. 201811626750.4, filed in China on Dec. 28, 2018, the disclosures of which are incorporated herein by reference in their entireties.

TECHNICAL FIELD

This disclosure relates to the field of communications technologies, and in particular, to a permission management method and a terminal device.

BACKGROUND

With continuous development of communications technologies, more and more applications can be installed and run on terminal devices to facilitate online shopping, entertainment, learning, real-time communication, and the like through applications on terminal devices. In the related art, during installation or running of an application, an authorization dialog box is usually displayed, and a corresponding permission-based operation can only be performed after authorization by a user. If an application needs to apply for a plurality of running permissions, a plurality of authorization dialog boxes may be displayed, and corresponding permission-based operations can only be performed after the user confirms the operations in those dialog boxes one by one, making permission management and control for applications on a terminal device cumbersome.

SUMMARY

Embodiments of this disclosure provide a permission management method and a terminal device.

This disclosure is implemented as follows:

According to a first aspect, an embodiment of this disclosure provides a permission management method, applied to a terminal device, where the terminal device includes a first display area and a second display area, and the method includes:

determining a target permission management policy corresponding to a first application based on a display area in which the first application is located; and controlling permission management for the first application according to the target permission management policy;

where the target permission management policy includes a first permission management policy corresponding to the first display area and/or a second permission management policy corresponding to the second display area.

According to a second aspect, an embodiment of this disclosure further provides a terminal device, where the terminal device includes a first display area and a second display area, and the terminal device further includes:

a first determining module, configured to determine a target permission management policy corresponding to a first application based on a display area in which the first application is located; and a control module, configured to control permission management for the first application according to the target permission management policy;

where the target permission management policy includes a first permission management policy corresponding to the first display area and/or a second permission management policy corresponding to the second display area.

According to a third aspect, an embodiment of this disclosure further provides a terminal device, including a processor, a memory, and a computer program stored in the memory and capable of running on the processor, where when the computer program is executed by the processor, the steps of the permission management method according to the first aspect are implemented.

According to a fourth aspect, an embodiment of this disclosure further provides a computer-readable storage medium, where the computer-readable storage medium stores a computer program, and when the computer program is executed by a processor, the steps of the permission management method according to the first aspect are implemented.

In the technical solutions provided in this embodiment of this disclosure, the terminal device can determine a target permission management policy corresponding to a first application based on a display area in which the first application is located, and then the terminal device can control permission management for the first application according to the target permission management policy. In this way, in a case that an application running on the terminal device needs to access another application, a permission management operation for the another application can be known simply based on a display area in which the running application is located, without need of authorization from the user to perform corresponding permission management. This simplifies permission management for an application by the terminal device, and improves handling efficiency of permission management by the terminal device.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by persons of ordinary skill in the art based on the embodiments of this disclosure shall fall within the protection scope of this disclosure.

Figure 1:
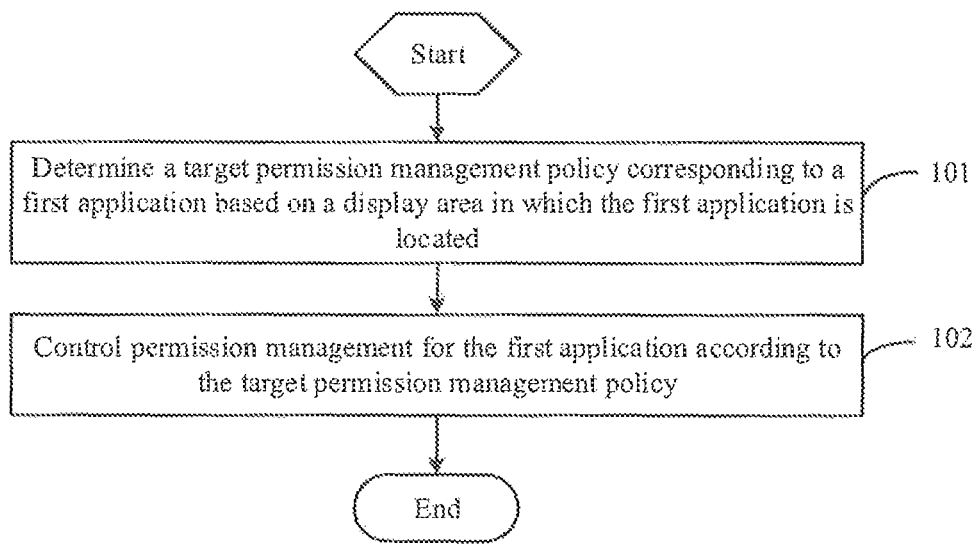
FIG. 1 is a flowchart of a permission management method according to an embodiment of this disclosure.

Referring to FIG. 1, FIG. 1 is a flowchart of a permission management method according to an embodiment of this disclosure, where the permission management method is applied to a terminal device, and the terminal device includes a first display area and a second display area. As shown in FIG. 1, the permission management method includes the following steps.

Step 101: Determine a target permission management policy corresponding to a first application based on a display area in which the first application is located.

The target permission management policy includes a first permission management policy corresponding to the first display area and/or a second permission management policy corresponding to the second display area. For example, the target permission management policy includes only a first permission management policy corresponding to the first display area. Alternatively, the target permission management policy includes only a second permission management policy corresponding to the second display area. In the following solutions in the embodiments of this disclosure, specific description is made by using an example in which the permission management policy includes the first permission management policy corresponding to the first display area and the second permission management policy corresponding to the second display area.

For example, if a display area in which the first application is currently located is the first display area, it is determined that a target permission management policy corresponding to the first application is the first permission management policy. The first application may refer to any one application installed on the terminal device, and the first permission management policy may be used to manage and control permissions of an application such as access permission, download permission, and geographic location information sharing permission.

In addition, the first display area and the second display area may be in a same display screen of the terminal device. Alternatively, the terminal device may have a first display screen and a second display screen, where the first display area is in the first display screen, and the second display area is in the second display screen.

Step 102: Control permission management for the first application according to the target permission management policy.

For example, if the first application is located in the first display area, the first application corresponds to the first permission management policy, and permission management for the first application is performed according to the first permission management policy.

For example, the first application is a chat application located in the first display area. When the first application needs to conduct a video chat, it accordingly needs to access a camera application on the terminal device. In this case, based on the first permission management policy currently corresponding to the first application, the chat application is controlled to perform a corresponding permission-based operation on the camera application according to a target permission in the first permission management policy. If in the first permission management policy, the target permission of the first application for the camera application is access allowed, the first application is controlled to be allowed to access the camera application, which ensures the chat application can open the camera application so that the chat application can perform video chat.

It should be noted that the permission management for the first application is not only for the permissions to access other applications, but also for the permissions for the first application itself, such as self-starting, displaying a floating window, and enabling Bluetooth. For example, in the first permission management policy, the management permission for Bluetooth is connection allowed. When the first application is located in the first display area, the first application automatically executes permission management for allowing Bluetooth connection.

In the technical solutions provided in this embodiment of this disclosure, the terminal device can determine a target permission management policy corresponding to a first application based on a display area in which the first application is located, and then the terminal device can control permission management for the first application according to the target permission management policy. In this way, in a case that an application running on the terminal device needs to access another application, a permission management operation for the another application can be known simply based on a display area in which the running application is located, without need of authorization from a user to perform corresponding permission management. This simplifies permission management for an application by the terminal device, and improves handling efficiency of permission management by the terminal device.

In a possible implementation, the step 101 may include:
determining, in a case that the first application is in an installing state, whether the first application uses a first preset permission management policy; obtaining, in a case that it is determined that the first application uses the first preset permission management policy, a display area in which the first application is located after installation is complete; and determining a target permission management policy corresponding to the first application in the first preset permission management policy based on the display area in which the first application is located after installation is complete.

The installing state may refer to an installation procedure executed after the terminal device downloads the first application. When the first application is in the installing state, a dialog box may be displayed to receive a user operation, so as to determine whether the first application uses the first preset permission management policy, or system settings of the first application may be detected, so as to determine whether the first application uses the first preset permission management policy. The first preset permission management policy includes a first permission management policy and a second permission management policy.

For example, when the first application is in the installing state, the terminal device displays a dialog box "Use first preset permission management policy?" on the display screen, and also displays selection buttons of "Yes" and "No" to receive the user's selection operation. When a user operation on the "Yes" selection button is received, it is determined that the first application uses the first preset permission management policy. Further, the display area in which the first application is located after installation is complete is determined. For example, if the first application is displayed in the first display area after installation, a target permission management policy for the first application is set to the first permission management policy.

In this way, after the first application is installed, its target permission management policy is also set, so that the first application is controlled to run based on its corresponding target permission management policy, which avoids the need for setting permission in the subsequent running process, thereby simplifying user operations, improving use experience of the terminal device, and also improving efficiency of permission management for applications on the terminal device.

Optionally, in a case that the first application is in an installing state, after determining whether the first application uses a first preset permission management policy, the method further includes:

in a case that it is determined that the first application does not use the first preset permission management policy, setting a permission management policy for the first application to the second preset permission management policy; and receiving a first operation by a user and changing the second preset permission management policy for the first application to the first preset permission management policy.

It should be noted that the first application may correspond to the second preset permission management policy if the first application does not use the first preset permission management policy. In this embodiment of this disclosure, the first preset permission management policy refers to a permission management policy based on a display area. In this case, if the first application is located in the first display area, the first application performs related operations according to the first permission management policy; and if the first application is located in the second display area, the first application performs related operations according to the second permission management policy. The second preset permission management policy refers to a permission management policy unassociated with a display area. In this case, the first application performs related operations according to a same permission management policy no matter whether the first application is located in the first display area or the second display area.

For example, when the first application is in the installing state, the terminal device displays a dialog box "Use first preset permission management policy?" on the display screen, and also displays selection buttons of "Yes" and "No". When a user operation on the "No" selection button is received, the permission management policy for the first application is set to the second preset permission management policy. In this way, the second preset permission management policy corresponding to the first application is unrelated to the display area in which the first application is located.

When the user needs to change the permission management policy for the first application, a change operation may be performed through a first operation. For example, the second preset permission management policy for the first application may be changed to the first preset permission management policy by receiving a first operation by the user in a system setup application of the terminal device, or in a setup option of the first application. In this case, it is necessary to determine the display area in which the first application is currently located. If the first application is currently located in the first display area, the second preset permission management policy originally corresponding to the first application is changed to the first permission management policy. If the first application is currently located in the second display area, the second preset permission management policy originally corresponding to the first application is changed to the second permission management policy.

This allows the permission management policy for applications on the terminal device to be controlled in a more humane and intelligent manner, and also improves the handling efficiency of the terminal device for application permission management.

In this embodiment of this disclosure, the step 102 may include:

controlling a permission-based operation of the first application on a target application according to the target permission management policy in a case that the first application is accessing the target application.

The target application may refer to at least one of applications installed on the terminal device other than the first application. In a case that the first application is accessing the target application, according to the target permission management policy corresponding to the display area in which the first application is currently located, an operation corresponding to the target permission management policy is controlled to be performed on the target application.

For example, the first application is a chat application located in the first display area. When the first application needs to add a new chatter, the first application may need to access the Contacts on the terminal device. In this case, if based on the fact that the target permission of the first application for the Contacts is access allowed in a first permission management policy currently corresponding to the first application, the first application is controlled to be allowed to access the Contacts. The display screen of the terminal device displays no dialog box like "Allow to access Contacts?", and access to the Contacts can be performed without authorization from the user. This simplifies permission management of the terminal device for applications, causes no interference to the user, and improves user experience.

In this embodiment of this disclosure, before the step 101, the method may further include:

performing at least one of the following in a case that the target application includes target data: setting a target permission for the target application to a first target permission in the first permission management policy; and setting a target permission for the target application to a second target permission in the second permission management policy.

The first target permission includes any one of access allowed, access denied, and outputting inquiry information, the second target permission includes any one of access allowed, access denied, and outputting inquiry information, and the first target permission is different from the second target permission.

It should be noted that the target data may be privacy data related to user's private information such as a contact list, a short message, a call record, a photo, a video, and geographic location information. For example, when the target application is the Contacts, it is accordingly determined that the target application includes target data. The target data may alternatively refer to other data specified by the user.

In a case that it is determined that the target application includes target data, a target permission for the target application is set to a first target permission in the first permission management policy, and/or a target permission for the target application is set to a second target permission in the second permission management policy.

Optionally, a target permission for an application that includes the target data is set to outputting inquiry information in the first permission management policy, a target permission for an application that includes no target data is set to access allowed in the first permission management policy, a target permission for an application that includes target data is set to access denied in the second permission management policy, and a target permission for an application that includes no target data is set to outputting inquiry information in the second permission management policy. It can be seen that the second permission management policy is stricter on permission management for a target application.

For example, if the first application is located in the second display area, the first application corresponds to the second permission management policy, and the target application is the Contacts that includes target data. When the first application is accessing the Contacts, the first application is controlled to perform an operation that prohibits access to the Contacts. If the target application is a video player application that includes no target data, when the first application is accessing the video player application, the first application is controlled to perform an outputting inquiry information operation on the video player application. For example, a dialog box "Allow to access?" is displayed on the display screen of the first application, and selection buttons of "Yes" and "No" are also displayed to control the operation of the first application on the target application by receiving an operation by the user.

In this embodiment of this disclosure, whether the target application includes target data is determined, to set the target permissions for the target application separately in the first permission management policy and the second permission management policy, so that different permission-based operations can be performed for applications on the terminal device, improving management performance of the terminal device for the applications.

In a possible implementation, after the step 102, the method may further include:

receiving a second operation by a user, where the second operation is an operation of moving the first application from a display area in which the first application is located to another display area; and responding to the second operation, and changing a target permission management policy corresponding to the first application to a target permission management policy corresponding to the display area in which the first application is located.

It may be understood that the user may change the target permission management policy corresponding to the first application by changing a location of the first application.

Figure 2:
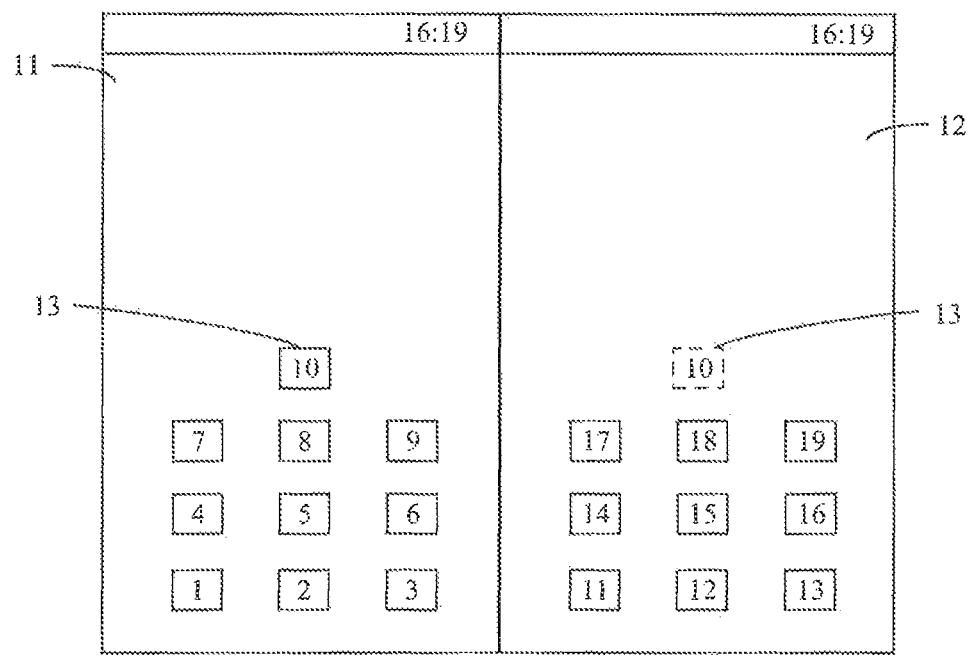
FIG. 2 is a schematic diagram of a display screen of a terminal device using the permission management method of FIG. 1.

Referring to FIG. 2, in a case that a first application 13 is located in a first display area 11, the first application 13 corresponds to a first permission management policy. When a second operation by a user is received, for example, a sliding operation that drags the first application 13 from the first display area 11 to a second display area 12, the first application 13 accordingly moves to the second display area 12. Correspondingly, a target permission management policy corresponding to the first application 13 is changed to a second permission management policy corresponding to the second display area 12.

In this way, the terminal device changes the display location of the application based on the second operation, to change the target permission management policy corresponding to the application, so that permission management for applications on the terminal device is easier and faster.

Figure 3:
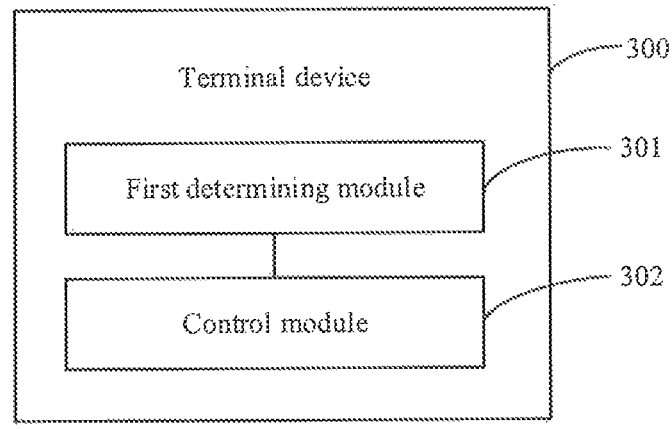
FIG. 3 is a structural diagram of a terminal device according to an embodiment of this disclosure.

Referring to FIG. 3, FIG. 3 is a structural diagram of a terminal device according to an embodiment of this disclosure, where the terminal device includes a first display area and a second display area. As shown in FIG. 3, the terminal device 300 includes:

a first determining module 301, configured to determine a target permission management policy corresponding to a first application based on a display area in which the first application is located; and a control module 302, configured to control permission management for the first application according to the target permission management policy;

where the target permission management policy includes a first permission management policy corresponding to the first display area and/or a second permission management policy corresponding to the second display area.

Optionally, the first determining module 301 includes:

a first determining submodule, configured to determine, in a case that the first application is in an installing state, whether the first application uses a first preset permission management policy;

an obtaining submodule, configured to obtain, in a case that it is determined that the first application uses the first preset permission management policy, a display area in which the first application is located after installation is complete; and a second determining submodule, configured to determine a target permission management policy corresponding to the first application in the first preset permission management policy based on the display area in which the first application is located after installation is complete.

Optionally, the first determining module 301 further includes:

a setting submodule, configured to set a permission management policy for the first application to a second preset permission management policy in a case that the first application does not use the first preset permission management policy; and a change submodule, configured to receive a first operation by a user and change the second preset permission management policy for the first application to the first preset permission management policy.

Optionally, the control module 302 is further configured to:

control a permission-based operation of the first application on a target application according to the target permission management policy in a case that the first application is accessing the target application.

The terminal device 300 further includes:

an execution module, configured to perform at least one of the following in a case that the target application includes target data:

setting a target permission for the target application to a first target permission in the first permission management policy; and setting a target permission for the target application to a second target permission in the second permission management policy;

where the first target permission includes any one of access allowed, access denied, and outputting inquiry information, the second target permission includes any one of access allowed, access denied, and outputting inquiry information, and the first target permission is different from the second target permission.

Optionally, the terminal device 300 further includes:

a receiving module, configured to receive a second operation by a user, where the second operation is an operation of moving the first application from a display area in which the first application is located to another display area; and a response module, configured to respond to the second operation, and change a target permission management policy corresponding to the first application to a target permission management policy corresponding to the display area in which the first application is located.

It should be noted that the terminal device 300 can implement the processes in the embodiment of the permission management method described with reference to FIG. 1, with the same beneficial effects achieved. To avoid repetition, details are not described herein again.

In the technical solutions provided in this embodiment of this disclosure, the terminal device 300 can determine a target permission management policy corresponding to a first application based on a display area in which the first application is located, and then the terminal device can control permission management for the first application according to the target permission management policy. In this way, in a case that an application running on the terminal device 300 needs to access another application, corresponding permission management is performed without an authorization operation by the user. This simplifies the permission management handling procedure of the terminal device 300 for the application, and improves handling efficiency of permission management by the terminal device 300.

Figure 4:
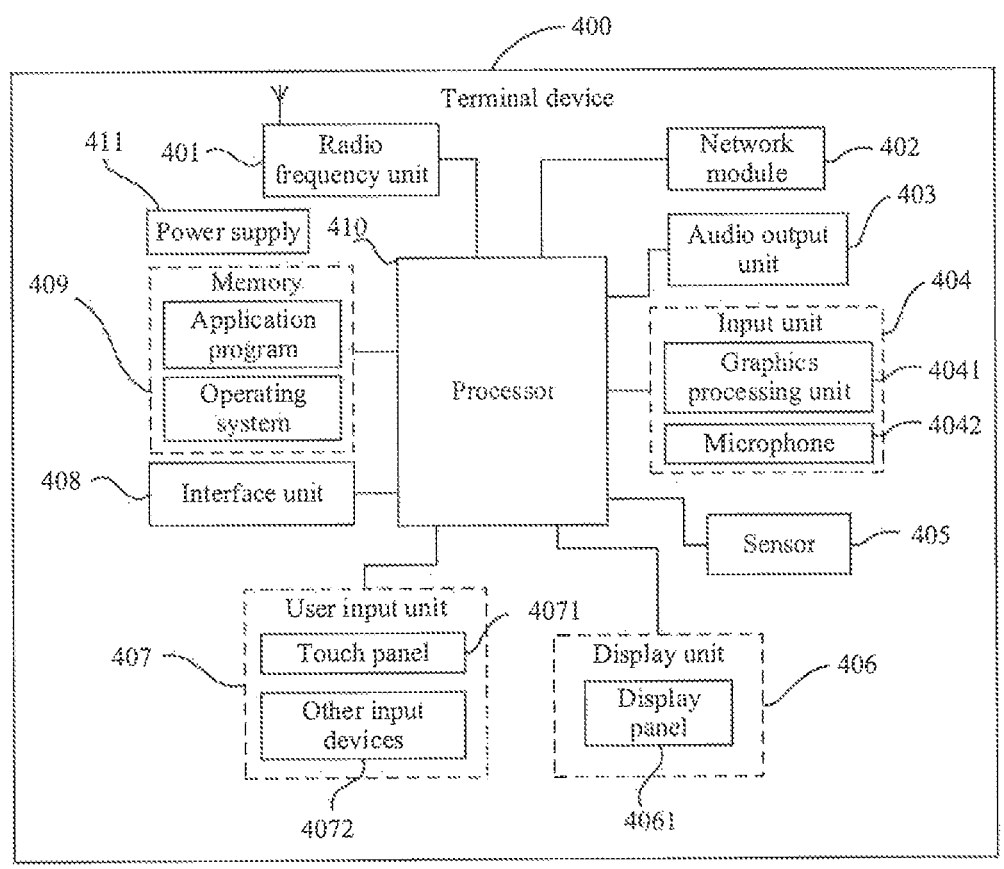
FIG. 4 is a structural diagram of another terminal device according to an embodiment of this disclosure.

Referring to FIG. 4, FIG. 4 is a structural diagram of another terminal device according to an embodiment of this disclosure. The terminal device 400 can implement the processes in the embodiment of the permission management method described with reference to FIG. 1, with the same beneficial effects achieved. As shown in FIG. 4, the terminal device 400 includes but is not limited to components such as a radio frequency unit 401, a network module 402, an audio output unit 403, an input unit 404, a sensor 405, a display unit 406, a user input unit 407, an interface unit 408, a memory 409, a processor 410, and a power supply 411. A person skilled in the art may understand that the terminal device is not limited to the terminal device structure shown in FIG. 4. The terminal device may include more or fewer components than those shown in the figure, or combine some of the components, or arrange the components differently. In this embodiment of this disclosure, the terminal device includes but is not limited to a mobile phone, a tablet computer, a laptop computer, a palmtop computer, an in-vehicle terminal, a wearable device, a pedometer, and the like.

The display unit 406 includes a first display area and a second display area.

The processor 410 is configured to:
determine a target permission management policy corresponding to a first application based on a display area in which the first application is located; and
control permission management for the first application according to the target permission management policy;
where the target permission management policy includes a first permission management policy corresponding to the first display area and/or a second permission management policy corresponding to the second display area.

The processor 410 is further configured to:
determine, in a case that the first application is in an installing state, whether the first application uses a first preset permission management policy;
obtain, in a case that it is determined that the first application uses the first preset permission management policy, a display area in which the first application is located after installation is complete; and
determine a target permission management policy corresponding to the first application in the first preset permission management policy based on the display area in which the first application is located after installation is complete.

The processor 410 is further configured to:
set a permission management policy for the first application to a second preset permission management policy in a case that the first application does not use the first preset permission management policy; and
receive a first operation by a user and change the second preset permission management policy for the first application to the first preset permission management policy.

The processor 410 is further configured to:
control a permission-based operation of the first application on a target application according to the target permission management policy in a case that the first application is accessing the target application; and
perform at least one of the following in a case that the target application includes target data:
setting a target permission for the target application to a first target permission in the first permission management policy; and
setting a target permission for the target application to a second target permission in the second permission management policy;
where the first target permission includes any one of access allowed, access denied, and outputting inquiry information, the second target permission includes any one of access allowed, access denied, and outputting inquiry information, and the first target permission is different from the second target permission.

The processor 410 is further configured to:
receive a second operation by a user, where the second operation is an operation of moving the first application from a display area in which the first application is located to another display area; and
respond to the second operation, and change a target permission management policy corresponding to the first application to a target permission management policy corresponding to the display area in which the first application is located.

In this embodiment of this disclosure, the terminal device 400 can determine a target permission management policy corresponding to a first application based on a display area in which the first application is located, and then the terminal device can control permission management for the first application according to the target permission management policy. In this way, in a case that an application running on the terminal device 400 needs to access another application, corresponding permission management is performed without an authorization operation by the user. This simplifies the permission management handling procedure of the terminal device 400 for the application, and improves handling efficiency of permission management by the terminal device 400.

It should be understood that in this embodiment of this disclosure, the radio frequency unit 401 may be configured to: receive and send information, or to receive and send a signal in a call process, and specifically, after receiving downlink data from a base station, send the downlink data to the processor 410 for processing; and also send uplink data to the base station. Usually, the radio frequency unit 401 includes, but is not limited to, an antenna, at least one amplifier, a transceiver, a coupler, a low noise amplifier, a duplexer, and the like. In addition, the radio frequency unit 401 may further communicate with a network and another device via a wireless communications system.

The terminal device 400 provides a user with wireless broadband internet access through the network module 402, for example, helping the user to send or receive an email, to browse a web page, or to access streaming media.

The audio output unit 403 may convert audio data received by the radio frequency unit 401 or the network module 402 or stored in the memory 409 into an audio signal and output the audio signal as a sound. In addition, the audio output unit 403 may further provide audio output (for example, a call signal received sound or a message received sound) that is related to a specific function performed by the terminal device 400. The audio output unit 403 includes a speaker, a buzzer, a phone receiver, and the like.

The input unit 404 is configured to receive an audio signal or a video signal. The input unit 404 may include a graphics processing unit (GPU) 4041 and a microphone 4042, and the graphics processing unit 4041 processes image data of a static image or a video obtained by an image capture apparatus (for example, a camera) in an image capture mode or a video capture mode. A processed image frame may be displayed on the display unit 406. An image frame processed by the graphics processing unit 4041 may be stored in the memory 409 (or another computer-readable storage medium) or sent by the radio frequency unit 401 or the network module 402. The microphone 4042 may receive a sound, and can process the sound into audio data. In a phone call mode, processed audio data may be converted, for output, into a format for transmission by the radio frequency unit 401 to a mobile communications base station.

The terminal device 400 further includes at least one sensor 405, for example, an optical sensor, a motion sensor, and other sensors. Specifically, the optical sensor includes an ambient light sensor and a proximity sensor. The ambient light sensor may adjust brightness of a display panel 4061 based on intensity of ambient light. When the terminal device 400 moves near an ear, the proximity sensor may disable the display panel 4061 and/or backlight. As a type of motion sensor, an accelerometer sensor may detect magnitudes of accelerations in all directions (usually three axes), may detect the magnitude and direction of gravity when the terminal is in a static state, and may be applied to terminal device posture recognition (for example, landscape/portrait mode switching, related gaming, or magnetometer posture calibration), functions related to vibration recognition (for example, pedometer or tapping), or the like. The sensor 405 may further include a fingerprint sensor, a pressure sensor, an iris sensor, a molecular sensor, a gyroscope, a barometer, a hygrometer, a thermometer, or an infrared sensor. Details are not described herein.

The display unit 406 is configured to display information input by the user or information provided for the user. The display unit 406 may include the display panel 4061, and the display panel 4061 may be configured in a form of a liquid crystal display (LCD), an organic light-emitting diode (OLED), or the like.

The user input unit 407 may be configured to receive entered numerical or character information, and generate key signal input that is related to user setting and function control of the terminal device 400. Specifically, the user input unit 407 includes a touch panel 4071 and other input devices 4072. The touch panel 4071 is also referred to as a touchscreen and can collect a touch operation of a user on or near the touch panel 4071 (for example, an operation performed by the user on the touch panel 4071 or near the touch panel 4071 with a finger or by using any appropriate object or accessory such as a stylus). The touch panel 4071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, sends the touch point coordinates to the processor 410, and receives and executes a command sent by the processor 410. In addition, the touch panel 4071 may be implemented in a plurality of types, for example, as a resistive, capacitive, infrared, or surface acoustic wave touch panel. In addition to the touch panel 4071, the user input unit 407 may further include the other input devices 4072. Specifically, the other input devices 4072 may include, but are not limited to, a physical keyboard, a function key (for example, a volume control key or a power on/off key), a track ball, a mouse, and a joystick. Details are not described herein.

Further, the touch panel 4071 may cover the display panel 4061. After detecting a touch operation on or near the touch panel 4071, the touch panel 4071 transmits the touch operation to the processor 410 to determine a type of a touch event. Then the processor 410 provides corresponding visual output on the display panel 4061 based on the type of the touch event. In FIG. 4, the touch panel 4071 and the display panel 4061 serve as two separate components to implement input and output functions of the terminal device 400. However, in some embodiments, the touch panel 4071 and the display panel 4061 may be integrated to implement the input and output functions of the terminal device 400. This is not specifically limited herein.

The interface unit 408 is an interface for connecting an external apparatus to the terminal device 400. For example, the external apparatus may include a wired or wireless headphone port, an external power (or battery charger) port, a wired or wireless data port, a memory card port, a port for connecting an apparatus having a recognition module, an audio input/output (I/O) port, a video I/O port, an earphone port, and the like. The interface unit 408 may be configured to receive input (for example, data information and electric power) from the external apparatus, and transmit the received input to one or more elements in the terminal device 400; or may be configured to transmit data between the terminal device 400 and the external apparatus.

The memory 409 may be configured to store software programs and various data. The memory 409 may mainly include a program storage region and a data storage region. The program storage region may store an operating system, an application required by at least one function (for example, an audio play function or an image play function), and the like. The data storage region may store data (for example, audio data and a phone book) created based on usage of the mobile phone. In addition, the memory 409 may include a high-speed random access memory, or may further include a nonvolatile memory, for example, at least one magnetic disk storage device or a flash memory device, or other volatile solid-state storage devices.

The processor 410 is a control center of the terminal device 400, uses various interfaces and lines to connect all parts of the entire terminal device 400, and performs various functions and data processing of the terminal device 400 by running or executing the software program and/or module stored in the memory 409 and invoking data stored in the memory 409, thereby performing overall monitoring on the terminal device 400. The processor 410 may include one or more processing units. Optionally, the processor 410 may integrate an application processor and a modem processor. The application processor mainly processes an operating system, a user interface, an application, and the like. The modem processor mainly processes wireless communication. It may be understood that the modem processor may alternatively not be integrated into the processor 410.

The terminal device 400 may further include a power supply 411 (for example, a battery) that supplies power to the components. Optionally, the power supply 411 may be logically connected to the processor 410 by using a power management system, so as to implement functions such as charging management, discharging management, and power consumption management by using the power management system.

In addition, the terminal device 400 includes some functional modules that are not illustrated. Details are not described herein again.

Optionally, an embodiment of this disclosure further provides a terminal device, including a processor, a memory, and a computer program stored in the memory and capable of running on the processor. When the computer program is executed by the processor, the processes of the foregoing embodiment of the permission management method are implemented, with the same technical effects achieved. To avoid repetition, details are not described herein again.

An embodiment of this disclosure further provides a computer-readable storage medium, where the computer-readable storage medium stores a computer program. When the computer program is executed by a processor, the processes of the foregoing embodiment of the permission management method are implemented, with the same technical effects achieved. To avoid repetition, details are not described herein again. For example, the computer-readable storage medium is a read-only memory (ROM), a random access memory (RAM), a magnetic disk, or an optical disc.

It should be noted that the terms "include", "comprise", and any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, however, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing descriptions are only specific implementations of this disclosure, but are not intended to limit the protection scope of this disclosure. Any variation or replacement readily figured out by persons skilled in the art within the technical scope disclosed in this disclosure shall fall within the protection scope of this disclosure. Therefore, the protection scope of this disclosure shall be subject to the protection scope of the claims.

What is claimed is:

1. A permission management method, applied to a terminal device, wherein the terminal device comprises a first display area and a second display area, and the method comprises:
   determining, by the terminal device in a case that a first application is in an installing state, whether the first application uses a first preset permission management policy or a second preset permission management policy in response to a user's selection operation;
   determining, by the terminal device when the terminal device determines that the first application uses the first preset permission management policy, a target permission management policy corresponding to a first application based on a display area in which the first application is located; and
   controlling, by the terminal device, permission management for the first application according to the target permission management policy;
   wherein the first preset permission management policy is a permission management policy based on a display area, the second preset permission management policy is a permission management policy unassociated with a display area, and the first preset permission management policy comprises a first permission management policy and a second permission management policy;
   in a case that the display area in which the first application is located is the first display area, the terminal device invokes the first permission management policy corresponding to the first display area, and determines the first permission management policy as the target permission management policy;
   in a case that the display area in which the first application is located is the second display area, the terminal device invokes the second permission management policy corresponding to the second display area, and determines the second permission management policy as the target permission management policy.

2. The method according to claim 1, wherein
   the determining, by the terminal in a case that the first application is in the installing state, whether the first application uses the first preset permission management policy comprises:
   obtaining, in a case that it is determined that the first application uses the first preset permission management policy, a display area in which the first application is located after installation is complete; and
   determining a target permission management policy corresponding to the first application in the first preset permission management policy based on the display area in which the first application is located after installation is complete.

3. The method according to claim 1, wherein the determining, by the terminal in a case that the first application is in the installing state, whether the first application uses a first preset permission management policy; comprises:
   setting a permission management policy for the first application to the second preset permission management policy in a case that the first application does not use the first preset permission management policy; and
   receiving a first operation by a user and changing the second preset permission management policy for the first application to the first preset permission management policy.

4. The method according to claim 1, wherein the controlling permission management for the first application according to the target permission management policy comprises:
controlling a permission-based operation of the first application on a target application according to the target permission management policy in a case that the first application is accessing the target application; and
before the determining a target permission management policy corresponding to a first application based on a display area in which the first application is located, the method further comprises:
performing at least one of the following in a case that the target application comprises target data:
setting a target permission for the target application to a first target permission in the first permission management policy; and
setting a target permission for the target application to a second target permission in the second permission management policy;
wherein the first target permission comprises any one of access allowed, access denied, and outputting inquiry information, the second target permission comprises any one of access allowed, access denied, and outputting inquiry information, and the first target permission is different from the second target permission.

5. The method according to claim 1, wherein when the terminal device determines that the first application uses the first preset permission management policy, after the controlling permission management for the first application according to the target permission management policy, the method further comprises:
receiving a second operation by a user, wherein the second operation is an operation of moving the first application from a display area in which the first application is located to another display area; and
responding to the second operation, and changing a target permission management policy corresponding to the first application to a target permission management policy corresponding to the display area in which the first application is located.

6. A terminal device, comprising a processor, a memory, and a computer program stored in the memory and capable of running on the processor, wherein the terminal device further comprises a first display area and a second display area, when the computer program is executed by the processor, the processor is configured to implement:
determining, in a case that a first application is in an installing state, whether the first application uses a first preset permission management policy or a second preset permission management policy in response to a user's selection operation;
determining, when the processor is configure to determine that the first application uses the first preset permission management policy, a target permission management policy corresponding to a first application based on a display area in which the first application is located; and
controlling permission management for the first application according to the target permission management policy;
wherein the first preset permission management policy is a permission management policy based on a display area, the second preset permission management policy is a permission management policy unassociated with a display area, and the first preset permission management policy comprises a first permission management policy and a second permission management policy;
in a case that the display area in which the first application is located is the first display area, the processor is configured to invoke the first permission management policy corresponding to the first display area, and determines the first permission management policy as the target permission management policy;
in a case that the display area in which the first application is located is the second display area, the processor is configured to invoke the second permission management policy corresponding to the second display area, and determines the second permission management policy as the target permission management policy.

7. The terminal device according to claim 6, wherein the processor is further configured to implement:
obtaining, in a case that it is determined that the first application uses the first preset permission management policy, a display area in which the first application is located after installation is complete; and
determining a target permission management policy corresponding to the first application in the first preset permission management policy based on the display area in which the first application is located after installation is complete.

8. The terminal device according to claim 6, wherein the determining, in a case that the first application is in the installing state, whether the first application uses a first preset permission management policy comprises:
setting a permission management policy for the first application to the second preset permission management policy in a case that the first application does not use the first preset permission management policy; and
receiving a first operation by a user and changing the second preset permission management policy for the first application to the first preset permission management policy.

9. The terminal device according to claim 6, wherein the processor is configured to implement:
controlling a permission-based operation of the first application on a target application according to the target permission management policy in a case that the first application is accessing the target application; and
before the determining a target permission management policy corresponding to a first application based on a display area in which the first application is located, the method further comprises:
performing at least one of the following in a case that the target application comprises target data:
setting a target permission for the target application to a first target permission in the first permission management policy; and
setting a target permission for the target application to a second target permission in the second permission management policy;
wherein the first target permission comprises any one of access allowed, access denied, and outputting inquiry information, the second target permission comprises any one of access allowed, access denied, and outputting inquiry information, and the first target permission is different from the second target permission.

10. The terminal device according to claim 6, wherein when the processor is configured to determine that the first application uses the first preset permission management policy, after the controlling permission management for the first application according to the target permission management policy, the processor is configured to implement:
receiving a second operation by a user, wherein the second operation is an operation of moving the first application from a display area in which the first application is located to another display area; and responding to the second operation, and changing a target permission management policy corresponding to the first application to a target permission management policy corresponding to the display area in which the first application is located.

11. A non-transitory computer-readable storage medium, wherein the non-transitory computer-readable storage medium stores a computer program, and when the computer program is executed by a terminal device comprising a first display area and a second display area, the terminal device is configured to implement:

determining, in a case that a first application is in an installing state, whether the first application uses a first set permission management policy or a second preset permission management policy in response to a user's selection operation;

determining, when the terminal device determines that the first application uses the first preset permission management policy, a target permission management policy corresponding to a first application based on a display area in which the first application is located; and controlling permission management for the first application according to the target permission management policy;

wherein the first preset permission management policy is a permission management policy based on a display area, the second preset permission management policy is a permission management policy unassociated with a display area, and the first preset permission management policy comprises a first permission management policy and a second permission management policy;

in a case that the display area in which the first application is located is the first display area, the terminal device invokes the first permission management policy corresponding to the first display area, and determines the first permission management policy as the target permission management policy;

in a case that the display area in which the first application is located is the second display area, the terminal device invokes the second permission management policy corresponding to the second display area, and determines the second permission management policy as the target permission management policy.

12. The non-transitory computer-readable storage medium according to claim 11, wherein the terminal device is further configured to implement:

obtaining, in a case that it is determined that the first application uses the first preset permission management policy, a display area in which the first application is located after installation is complete; and determining a target permission management policy corresponding to the first application in the first preset permission management policy based on the display area in which the first application is located after installation is complete.

13. The non-transitory computer-readable storage medium according to claim 11, wherein the determining, in a case that the first application is in the installing state, whether the first application uses a first preset permission management policy comprises setting a permission management policy for the first application to the second preset permission management policy in a case that the first application does not use the first preset permission management policy; and receiving a first operation by a user and changing the second preset permission management policy for the first application to the first preset permission management policy.

14. The non-transitory computer-readable storage medium according to claim 11, wherein the terminal device is further configured to implement:

controlling a permission-based operation of the first application on a target application according to the target permission management policy in a case that the first application is accessing the target application; and before the determining a target permission management policy corresponding to a first application based on a display area in which the first application is located, the method further comprises:

performing at least one of the following in a case that the target application comprises target data:

setting a target permission for the target application to a first target permission in the first permission management policy; and setting a target permission for the target application to a second target permission in the second permission management policy;

wherein the first target permission comprises any one of access allowed, access denied, and outputting inquiry information, the second target permission comprises any one of access allowed, access denied, and outputting inquiry information, and the first target permission is different from the second target permission.

15. The non-transitory computer-readable storage medium according to claim 11, wherein when the terminal device determines that the first application uses the first preset permission management policy, after the controlling permission management for the first application according to the target permission management policy, the terminal device is further configured to implement:

receiving a second operation by a user, wherein the second operation is an operation of moving the first application from a display area in which the first application is located to another display area; and responding to the second operation, and changing a target permission management policy corresponding to the first application to a target permission management policy corresponding to the display area in which the first application is located.

* * * * *